United States Patent
Sugiura et al.

(10) Patent No.: US 7,930,078 B2
(45) Date of Patent: Apr. 19, 2011

(54) PARKING ASSIST METHOD AND A PARKING ASSIST APPARATUS

(75) Inventors: Hiroaki Sugiura, Okazaki (JP); Hideto Miyazaki, Okazaki (JP); Toshihiro Mori, Okazaki (JP)

(73) Assignee: Aisin Aw Co., Ltd. (JP)

( * ) Notice: Subject to any disclaimer, the term of this patent is extended or adjusted under 35 U.S.C. 154(b) by 1024 days.

(21) Appl. No.: 11/582,352

(22) Filed: Oct. 18, 2006

(65) Prior Publication Data

US 2007/0088474 A1   Apr. 19, 2007

(30) Foreign Application Priority Data

Oct. 19, 2005   (JP) ................................. 2005-304936

(51) Int. Cl.
*B60Q 1/48* (2006.01)

(52) U.S. Cl. .............. 701/36; 701/301; 701/1; 340/436; 340/435; 340/932.2; 382/104

(58) Field of Classification Search ......................... None
See application file for complete search history.

(56) References Cited

U.S. PATENT DOCUMENTS

| | | | | |
|---|---|---|---|---|
| 7,643,935 | B2 * | 1/2010 | Sakakibara et al. | 701/207 |
| 2003/0108222 | A1 * | 6/2003 | Sato et al. | 382/104 |
| 2005/0128061 | A1 | 6/2005 | Yanai | 340/435 |
| 2006/0287825 | A1 * | 12/2006 | Shimizu et al. | 701/216 |
| 2006/0287826 | A1 * | 12/2006 | Shimizu et al. | 701/216 |
| 2007/0021881 | A1 * | 1/2007 | Mori | 701/28 |
| 2007/0057816 | A1 * | 3/2007 | Sakakibara et al. | 340/932.2 |
| 2007/0076526 | A1 * | 4/2007 | Aikyo et al. | 367/128 |
| 2007/0088474 | A1 * | 4/2007 | Sugiura et al. | 701/36 |
| 2007/0097209 | A1 * | 5/2007 | Kubota | 348/118 |
| 2008/0097700 | A1 * | 4/2008 | Grimm | 701/301 |
| 2008/0100614 | A1 * | 5/2008 | Augst | 345/419 |

FOREIGN PATENT DOCUMENTS

| | | |
|---|---|---|
| JP | 2002-029314 | 1/2002 |
| JP | 2003-244688 | 8/2003 |
| JP | 2004-350303 | 12/2004 |
| JP | 2005-001570 | 1/2005 |
| JP | 2005-284877 | 10/2005 |

* cited by examiner

*Primary Examiner* — Khoi Tran
*Assistant Examiner* — Brian J Broadhead
(74) *Attorney, Agent, or Firm* — Bacon & Thomas, PLLC (57) ABSTRACT

A parking assist apparatus includes a CPU for obtaining image data from a camera mounted on a vehicle, an image memory for storing the obtained image data as recorded image data, and an image processor for recognizing an object based on the image data. The image processor determines when to display a parking assist image to reveal an area hidden as a blind spot of the camera when the recognized object is in the blind spot of the camera and displays the parking assist image combining both current image data and the recorded image data for the area currently hidden as the blind spot of the camera, together with an indicator indicating the current position of the vehicle superimposed on the display.

10 Claims, 11 Drawing Sheets

PARKING ASSIST METHOD AND A PARKING ASSIST APPARATUS

INCORPORATION BY REFERENCE

The disclosure of Japanese Patent Application No. 2005-304936 filed on Oct. 19, 2005, including the specification, drawings and abstract thereof, is incorporated herein by reference in its entirety.

BACKGROUND OF THE INVENTION

1. Field of the Invention

The present invention relates to a parking assist method and a parking assist apparatus.

2. Description of the Related Art

One known parking assist apparatus, for assisting in a series of operations in parking a vehicle, obtains image data using an in-vehicle camera which is attached to the rear of the vehicle and outputs the image data on a monitor display mounted near the driver's seat. Although the in-vehicle camera typically provides images of the area behind the vehicle (or more specifically, images of the area behind the rear bumper of the vehicle), the area beneath the body of the vehicle and the area around a rear corner of the vehicle are out of the viewing area of the in-vehicle camera. Therefore, the further the vehicle enters a parking space, the less guidance landmarks, such as a white line marking the parking space, can be seen in the viewing area of the in-vehicle camera, so that it becomes difficult for a driver to park the vehicle because the driver can not determine the relative distance between the vehicle and the parking space or the position of a wheel stop in the monitor.

To resolve such a problem, an apparatus, which stores image data obtained by an in-vehicle camera in a memory and which displays composite image data made up of accumulated past image data and current image data, for example, is disclosed in Japanese Unexamined Patent Application Publication No. 2003-244688. Such an apparatus reads out image data for an area (blind spot) hidden from the in-vehicle camera and outputs a composite image using the image data.

However, in the conventional apparatus described above, the composite image is always displayed upon completion of storing image data, for example, even during the early stage of parking such as when the vehicle has not even begun to enter a parking space. Therefore, even if the driver wants to see a wide view of the area which is currently imaged by the in-vehicle camera, the unwanted composite image may be displayed on the monitor. Accordingly, there is a need for an apparatus which displays the composite image only at a suitable time, i.e. when the driver wants to see the area (blind spot) hidden from the in-vehicle camera.

SUMMARY OF THE INVENTION

Accordingly, it is an object of the present invention to provide a parking assist method and a parking assist apparatus for displaying a parking assist image using recorded image data at a suitable time.

To solve the problems described above, the present invention provides a parking assist method for accumulating image data, which is obtained from an imaging device mounted on a vehicle, as recorded image data in an image data storage means, displaying a parking assist image using the recorded image data, wherein an area hidden from the imaging device (blind spot of the imaging device) is shown, recognizing an object in the vicinity of the vehicle, and determining when to display the parking assist image, wherein the area hidden from the imaging device is shown, based on the position of the object in relation to the blind spot of the imaging device.

The present invention also provides a parking assist apparatus for mounting in a vehicle, comprising: image data obtaining means for obtaining image data from an imaging device mounted on the vehicle; image data storage means for storing the obtained image data as recorded image data; recognizing means for recognizing an object; determining means for determining when to display a parking assist image, wherein an area hidden as a current blind spot of the imaging device is shown, based on the position of the recognized object in relation to the blind spot of the imaging device; and display control means for displaying the parking assist image using both the current image data currently obtained at the current position of the vehicle and the stored recorded image data including the area hidden as the current blind spot of the imaging device and for also displaying an indicator indicating the current position of the vehicle within (or superimposed on) the parking assist image, at a suitable time determined by the determining means. Therefore, for example, when the recognized object is located within the field of view of the imaging device, the parking assist apparatus may output a view of the background of the vehicle on a rear monitor screen and switch the screen to the parking assist image at a suitable moment when the recognized object is about to go or is going out of the field of view of the imaging device. More specifically, when the object which the driver wants to check leaves the field of view of the imaging device (goes out of sight), the area hidden as the blind spot, wherein the object is currently located, is displayed so that the driver may continuously check the position of the object, even though the current imaging device is not actually (currently, i.e. in real time) taking an image of the object within the blind spot area. As a result, the driver is assisted in parking the vehicle beginning at an intended position within the parking space. Further the driver may operate the vehicle to reduce impact of contact between the vehicle and the wheel stop, e.g. a low concrete barrier at the rear of a parking space.

The determining means may determine that the moment a part or full view of the recognized object enters the blind spot of the imaging device is the appropriate time to display the parking assist image using the recorded image data. Therefore, for example, when the object is located under the vehicle and therefore is no longer included within the image data, the recorded image data is output instead, so that the driver may still know the relative position and the relative distance between the vehicle and the object.

The imaging device may be mounted on the upper side of the bumper of the vehicle, in which case the determining means may determine that the moment a part or the entire recognized object moves under the bumper of the vehicle is the appropriate time to display the parking assist image. Therefore, the parking assist image may be displayed at the time when the object is located under the bumper in accordance with movement of the vehicle toward the parking space.

The display control means may output the recorded image data including that of the area hidden as the blind spot of the imaging device within a display area of the display means so that the direction of movement in the image displayed is that of the recognized object. Therefore, even if a part or full view of the object can not be seen in the display, the blind spot may be displayed in the direction of movement towards the object, so that the driver may easily understand which part of the road surface is currently displayed.

The recognized object maybe a wheel stop or a white line indicating a parking space, and the recognizing means recognizes the wheel stop or the white line by processing of the image data. Therefore, if the wheel stop or the white line goes out of the field of view of the imaging device, the recorded image data including the area hidden by the blind spot may be displayed at a suitable moment, and may allow the driver to check the relative position and the distance between a wheel of the vehicle and the wheel stop or the relative position and the distance between the rear of the vehicle and the white line.

Alternatively, the recognized object maybe an obstacle located within or around the parking space, and the recognizing means recognizes the obstacle by processing of the image data. Therefore, when the obstacle goes out of the field of view (viewing area) of the imaging device, the recorded image data including the area hidden as the blind spot may be displayed. Thus the driver may check the relative position and distance between the vehicle and the obstacle at a suitable time.

The recognizing means may recognize the object on the basis of an input through operation of an input operation device to specify the object. This operation enables the driver to select the object for determine the position of the vehicle relative thereto.

The parking assist apparatus of the present invention displays, responsive to a determination by the determining means that the parking assist image should not now be displayed, the image data currently obtained at the current position of the vehicle on the display screen, instead of the parking assist image. Therefore, when the object is within the viewing range of the imaging device, a wide-angle view of the background of the vehicle is displayed on the display screen.

DESCRIPTION OF THE PREFERRED EMBODIMENTS

An embodiment of the present invention is described below with reference to FIGS. 1 to 13.

Figure 1:
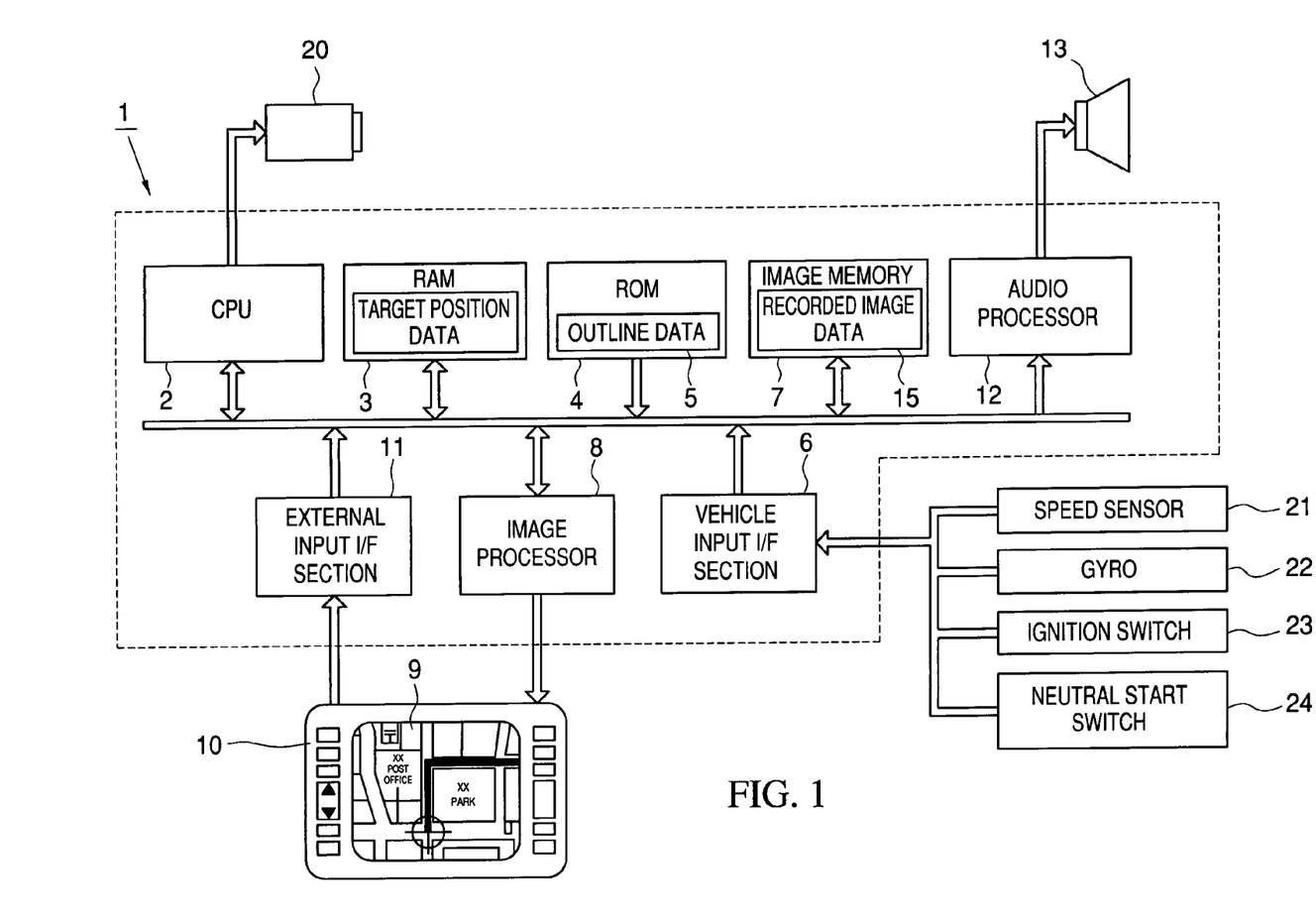
FIG. 1 is a block diagram of a parking assist apparatus according to the present invention.

As shown in FIG. 1, a parking assist apparatus 1 mounted in a vehicle C includes a CPU 2 as an image data obtaining means. The CPU 2 receives, as input, a speed pulse and a direction detection signal of a speed sensor 21 and a gyro 22, respectively, through a vehicle input I/F section 6. Further, the CPU 2 calculates the relative coordinates of a reference position of the vehicle C based on the input speed pulse and the direction detection signal.

The CPU 2 also receives as inputs the on/off signals of an ignition system (not shown) from an ignition switch 23 of the vehicle C via the vehicle input I/F section 6. When the CPU 2 receives the on-signal from the ignition switch 23, the parking assist apparatus 1 is activated. When the CPU 2 receives the off-signal, the running parking assist apparatus 1 enters a standby mode and waits for the next on-signal from the ignition switch 23. Next, the CPU 2 receives a shift position signal, indicating the current shift position, from a neutral start switch 24, via the vehicle input I/F section 6. The CPU 2 updates the shift position as a variable stored in a RAM 3, based on the shift position signal.

Figure 2:
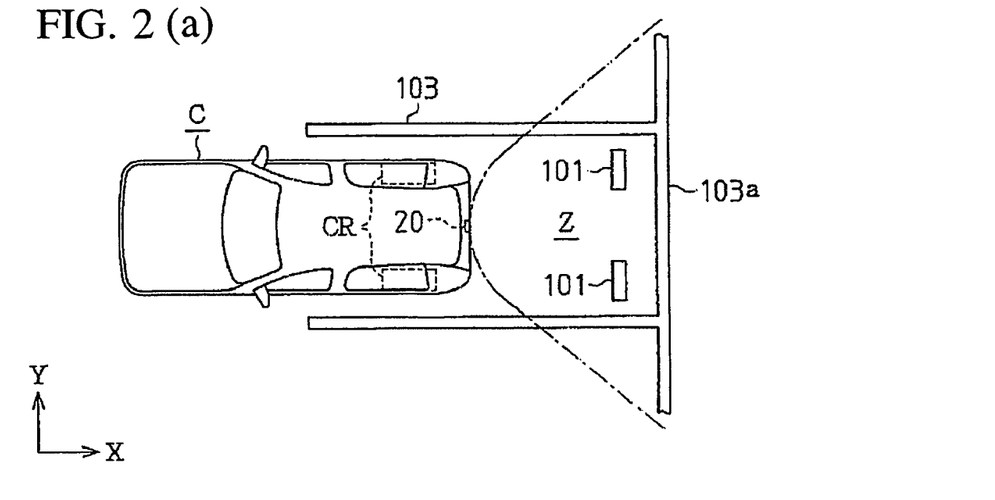
FIG. 2A is a diagram showing a vehicle entering a parking space and FIG. 2B is a diagram showing the vehicle after parking has been completed.
Figure 2B:
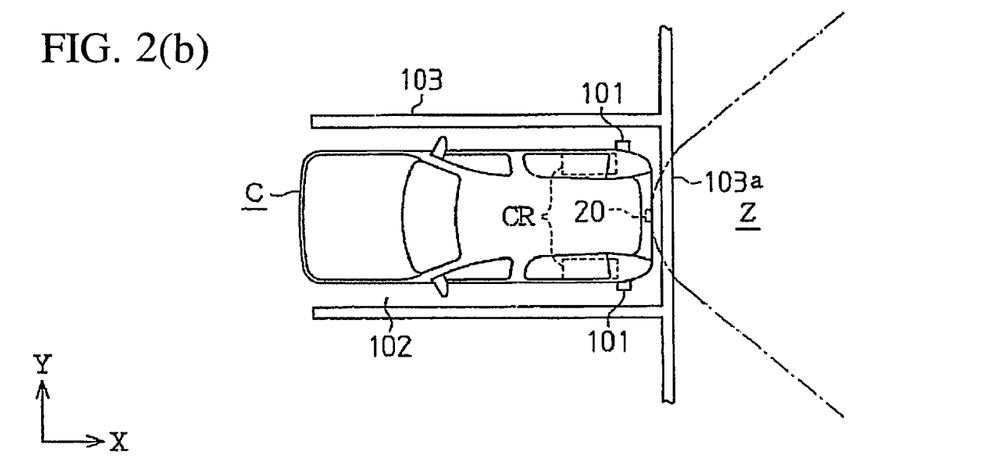

When the CPU 2 receives the on-signal from the ignition switch 23, the CPU 2 activates a camera 20 (on-board imaging device) mounted on the vehicle C and obtains image data G which including visual information for the area behind the vehicle C at a given time. As shown in FIGS. 2A and 2B, the camera 20 is positioned roughly in the center of the rear of the vehicle (on the y-axis of the vehicle coordinate system) and the optical axis of the camera faces downward. The camera 20 is a digital camera capable of taking color images and generating the image data G which undergoes analog/digital conversion. The digital camera may have optics (not shown) such as, for example, a wide-angle lens, a mirror, and so on, and a CCD image sensor (not shown). For example, the camera 20 may have a 140 degree wide field of view and the viewing area Z of the camera 20 may extend about several meters from the rear bumper of the vehicle C.

Figure 3:
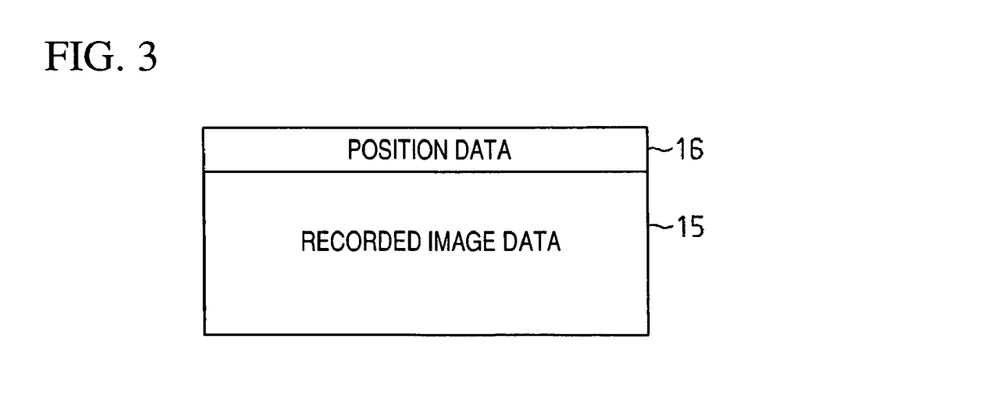
FIG. 3 is a diagram of recorded image data.

The CPU 2 stores the image data G as recorded image data 15 in an image memory 7, which functions as an image data storage means, at a suitable time in correlation with position data 16 indicating an image position as shown in FIG. 3. The recorded image data 15 may include a white line 103 marking a parking space 102 on the road surface behind the vehicle C and a wheel stop 101 (as shown in FIG. 2).

Figure 4:
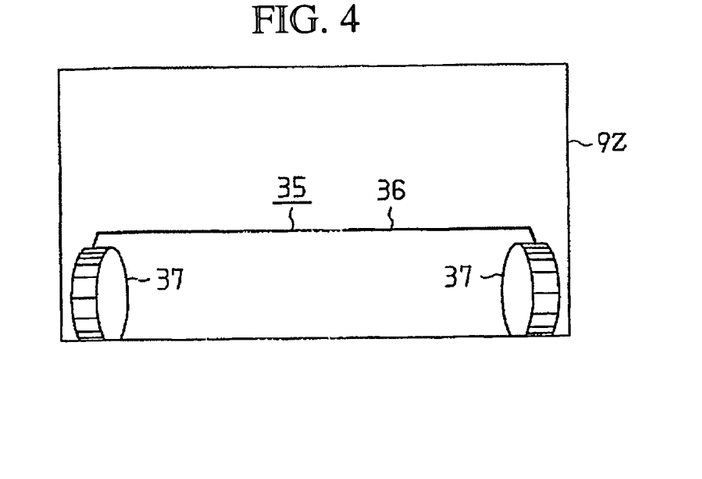
FIG. 4 is a diagram showing an added line.

Further, as shown in FIG. 1, outline data 5 may be stored in a ROM 4 of the parking assist apparatus 1. The outline data 5 is data for generating an outline of the vehicle C in which the parking assist apparatus 1 is installed, as shown in FIG. 2. When the outline data 5 is output in a display 9 during a parking assist mode, an additional line 35 is displayed in a display area 9z on the display 9 as a guide, as shown in FIG. 4. The added line 35 may include a framework line 36 indicating the outline of the rear of the vehicle and a wheel line 37 indicating the position of each rear wheel CR (FIG. 2). The framework line 36 and the wheel line 37 are virtual lines indicating, respectively, the positions of the rear of the vehicle and the rear wheels CR, as seen from the center point between the rear wheels CR.

An image processor 8, which functions as the recognizing means, the determining means, and the display control means in FIG. 1, manipulates the image data G taken by the camera 20. More specifically, the image processor 8 detects an object behind the vehicle C on the basis of the image data G. In the present embodiment, the recognized object is the wheel stop 101 behind the vehicle C, the white line 103 marking the parking space 102 (in FIG. 2), or an obstacle 104.

Figure 5A:
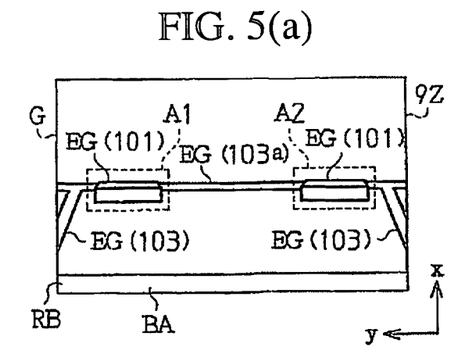
FIGS. 5A and 5B are diagrams showing detection of edges for image data of a wheel stop and FIG. 5C is a diagram showing image data when the wheel stop goes out of range of the on-board camera.
Figure 5B:
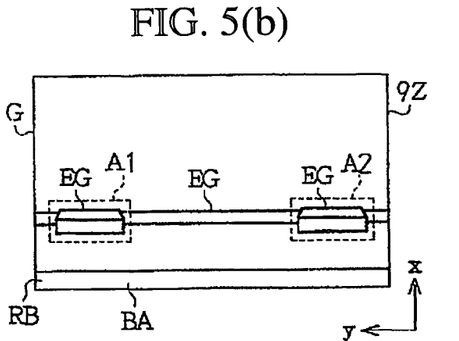

For example, as shown in FIGS. 5A and 5B, the image processor 8 detects edges from the image data G. Then the image processor 8 searches for an edge EG of the recognized object among all detected edges EG, on the basis of pattern information data (not shown) given therefor. Alternatively, the image processor 8 may abstract feature points other than an edge. As pattern information, the image processor 8 may obtain data indicating the number of feature points which are known when the edge of the wheel stop 101 is detected or template data indicating the shape of the wheel stop 101. The image processor 8 determines whether image data pertaining to the recognizable edge EG of the wheel stop 101 is in the image data G, on the basis of all the detected edges EG and the pattern information. Since the camera 20 has a wide-angle lens, the actual image data G may be distorted due to lens aberration. However, such image distortion is not shown here for sake of simplicity.

When the image processor 8 recognizes the white line 103, the image processor 8 detects the edge EG of the white line 103 from the image data G as shown in FIG. 5A. Then, on the basis of a number of features of the detected edge EG, the image processor 8 determines whether or not the edge EG is that of the white line 103.

Figure 6A:
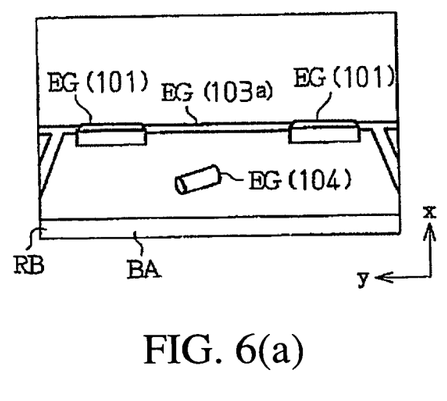
FIG. 6A is a diagram showing detection of edges for image data of an obstacle and FIG. 6B is a diagram showing image data when the obstacle becomes out of range of the on-board camera.

The image processor 8 further detects the obstacle 104 on the road such as, a relatively large stone, a can, or a piece of trash, based on the image data G. As shown in FIG. 6A, the image processor 8 detects edges from the image data G and determines edges which form some sort of figure, such as edges in groups, circular edges, and brachymorphic edges, as the edge EG of the obstacle 104.

The image processor 8 tracks the edges EG of each of the wheel stop 101, the white line 103, and the obstacle 104 in accordance with the movement of the vehicle C. For example, as shown in FIG. 5A, the image processor 8 temporarily stores pixel coordinates of each of a small area A1 and a small area A2 including the edge EG of the detected wheel stop 101. Then the image processor 8 inputs newly obtained image data G from the CPU 2. Based on the speed pulse input by the CPU 2, the image processor 8 determines new coordinates for the positions to which the previously input small areas A1 and A2 in the image data G are moved, in accordance with the direction of movement of the vehicle and the distance moved. As shown in FIG. 5B, a new edge EG, which has the smallest difference from the previously detected edge EG of the wheel stop 101 is searched for within and around the small areas A1 and A2, with movement of the vehicle. Alternatively a new edge EG, which is similar to the previously detected edge EG of the wheel stop 101, may be searched for within the display area 9z.

Whenever inputting the image data G through the CPU 2, the image processor 8 calculates a relative position between the edge EG corresponding to the recognized object and an area BA behind the vehicle within the image data G, on the basis of the image data G. The term "the area BA behind the vehicle" here means an area including the rear of the vehicle RB and the rear bumper 25 of the vehicle C. In this case, the position of the camera 20 and its optical axis are fixed so that the relative position between the camera 20 and the rear bumper 25 is fixed as well. Therefore, the coordinates for the area BA behind the vehicle may be calculated in advance.

Figure 7:
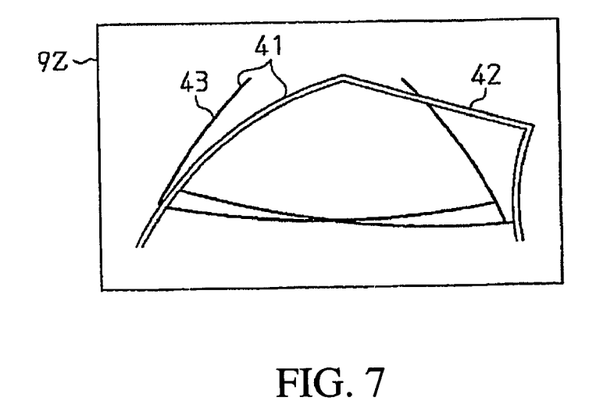
FIG. 7 is a diagram showing a guide line.

Next, the image processor 8 waits for the edge EG to completely enter the area BA behind the vehicle during tracking, the edge EG corresponding to the recognized object such as, for example, the wheel stop 101. As shown in FIG. 5A, when the wheel stop 101 is within the viewing area Z of the camera 20, the image processor 8 outputs the current image data G on the monitor screen 9 and superimposes a guide line 41 on the image data G as shown in FIG. 7. The guide line 41 may include a probable movement locus 42, drawn depending on the rudder angle of the vehicle C, and an extended line 43 indicating the width of the vehicle C.

Figure 5C:
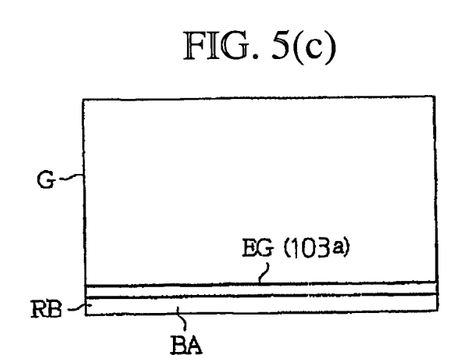

Then as shown in FIG. 2B, when the vehicle C enters the parking space 102 and the wheel stop 101 is located under the rear of the vehicle C, the wheel stop 101 is no longer within the viewing area Z of the camera 20. More specifically, as shown in FIG. 5C, when the edge EG corresponding to the wheel stop 101 has completely entered the area BA behind the vehicle, the image processor 8 determines that an image, created by using the previously recorded image data 15, should be displayed on the display 9. The recorded image data 15 used by the image processor 8 at this time is data including the hidden area which is the blind spot of the camera 20.

In a similar manner, the image processor 8 tracks the edges EG of the white line 103 and the obstacle 104 in accordance with the movement of the vehicle C. When tracking the edge EG of the white line 103, the image processor 8 tracks, not the entirety of the white lines 103, but only the end white line 103a (as shown in FIG. 2A), which runs roughly at right angles to the direction of movement of the vehicle C within the parking space 102. Then the image processor 8 waits until the edge EG corresponding to the white line 103a completely enters the area BA behind the vehicle, at which point an image formed using the recorded image data 15 is output on the monitor screen.

Figure 6B:
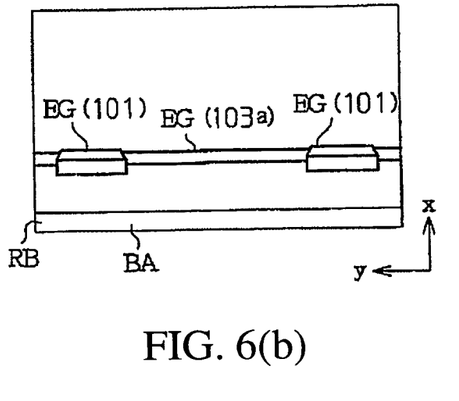

When tracking the obstacle 104, as shown in FIG. 6B, when the edge EG corresponding to the obstacle 104 has completely entered the BA area behind the vehicle BA, the image processor 8 outputs an image using the recorded image data 15 on the display 9. Note that, when the image processor 8 detects the edges EG for a number of objects such as, for example, the wheel stop 101, the white line 103a, and the obstacle 104, the image processor 8 displays the image using the recorded image data 15 on the monitor screen 9 when any one of edges EG for the detected objects has completely entered the area BA behind the vehicle.

The display 9 connected to the parking assist apparatus 1 is a touch panel. When an input is made on the touch panel, the CPU 2 receives a predetermined signal corresponding to the input operation through an external input I/F section 11 of the parking assist apparatus 1 (as shown in FIG. 1). The CPU 2 also receives a predetermined signal corresponding to an input operation through the external input I/F section 11 when an input is made by means of an operation switch 10 (input operation means) mounted next to the monitor screen. The parking assist apparatus 1 may include an audio processor 12 which outputs an alarm and/or guidance from a speaker 13 connected to the parking assist apparatus 1.

Figure 8:
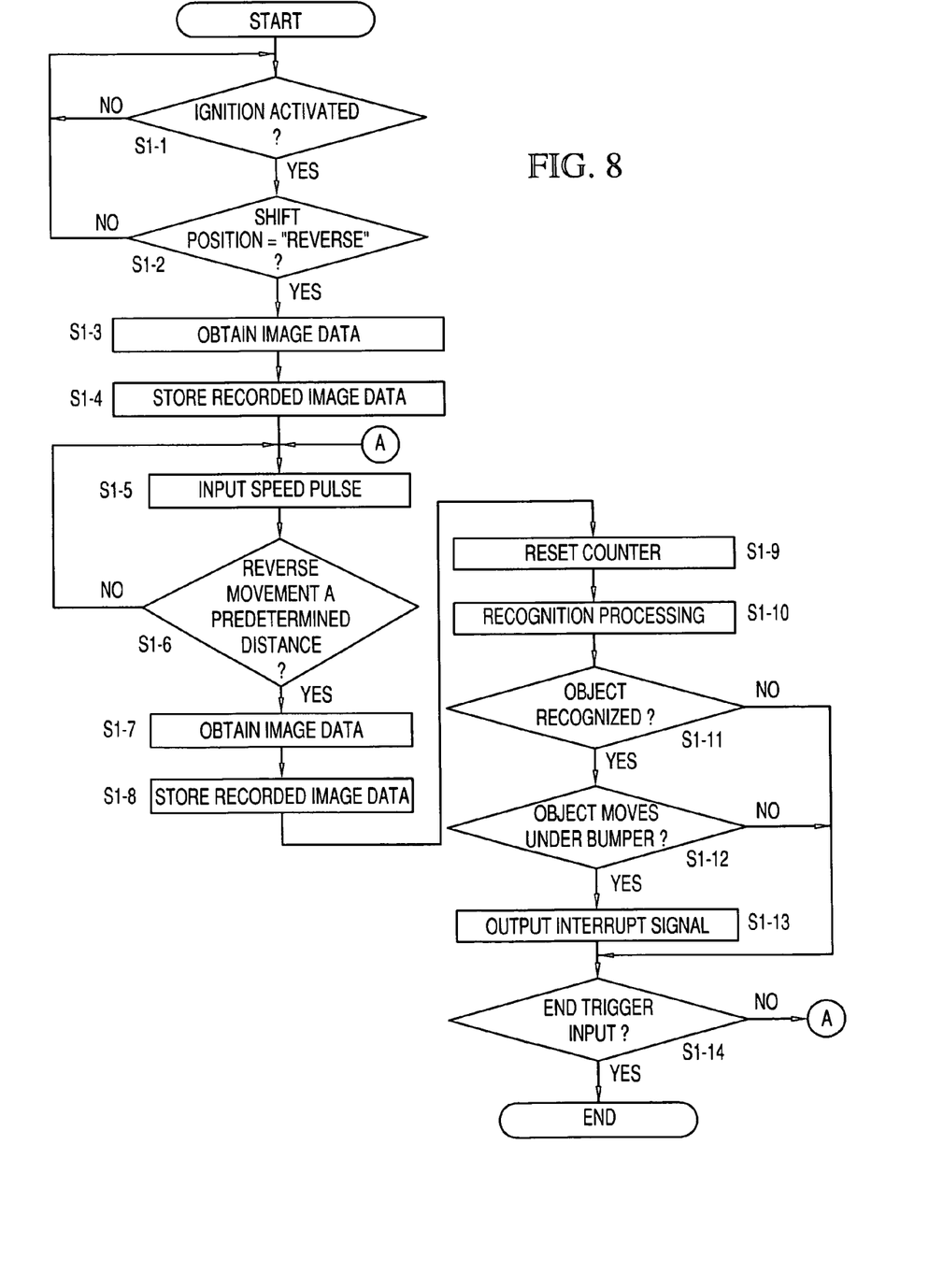
FIG. 8 is a flowchart of the method according to an embodiment of the present invention.

Next, the method of the present invention will be described with reference to FIG. 8. As shown in FIG. 8, the CPU 2 of the parking assist apparatus 1 waits for an on-signal from the ignition switch 23 to determine whether the ignition system is activated (Step S1-1). Responsive to receipt of the on-signal from the ignition switch 23 (Step S1-1=YES), the CPU 2 sets a bootable flag stored in the RAM 3 as "1" which means "on-state". Next, the CPU 2 determines whether or not the shift position of the current vehicle C is "reverse", based on the shift position signal from the neutral start switch 24 (Step S1-2). If the shift position is other than "reverse" (Step S1-2=NO), the CPU 2 sets a value for the shift position as a variable stored in the RAM 3 and the execution of the routine returns to Step S1-1. On the other hand, if the shift position is "reverse" (Step S1-2=YES), the CPU 2 changes the shift position stored in the RAM 3 as "reverse", and the new position, established by the shift from "reverse", is set as an initial position.

When the shift position is changed to "reverse", the CPU 2 controls the camera 20 to obtain the image data G taken at the initial position (Step S1-3). Then the CPU 2 stores new image data including both image data G and position data 16 indicating the initial position correlated with the image data G, as the recorded image data 15 in the image memory 7 (Step S1-4).

When storing the recorded image data 15 based on an image captured at the initial position, the CPU 2 receives as input the speed pulse from the speed sensor 21 (Step S1-5). In accordance with the number of input pulses, the CPU 2 updates a distance counter stored in the RAM 3, the distance counter accumulating the number of input pulses. Every time pulses are input, the number of input pulses is added to the number of pulses C1 accumulated in the counter.

The CPU 2 determines whether or not the number of the accumulated pulses C1 is a number corresponding to a predetermined distance and further determines whether or not the vehicle C has moved in reverse such a predetermined distance (Step S1-6). In the present embodiment, the predetermined distance is set at 200 mm. When the CPU 2 determines that the vehicle C has not traveled in reverse the predetermined distance (200 mm) in Step S1-4, the routine returns to Step S1-3. The CPU 2 waits for the vehicle C to move in reverse the predetermined distance (200 mm) during updating of the distance counter.

When the CPU 2 determines that the vehicle C has moved in reverse the predetermined distance (200 mm) in Step S1-6, the CPU 2 controls the camera 20 to obtain the image data G (Step S1-7). The CPU 2 then calculates the relative coordinates of the current position based on the initial position, where the shift position was changed to "reverse", based on the speed pulses and the direction detection signal, and correlates the relative coordinates with the obtained image data G as the position data 16. Then the CPU 2 stores the image data G as the recorded image data 15 in the image memory 7 (Step S1-8). As the CPU 2 stores the recorded image data 15 in the image memory 7, the CPU 2 resets the number of the accumulated pulses C1 of the distance counter to the initial value "0" (Step S1-9).

Next, the CPU 2 controls the image processor 8 to recognize the objects as described above based on the image data G obtained in Step S1-5 (Step S1-10). More specifically, the CPU 2 detects edges from the image data G and searches the edges EG for the recognized objects among all of the detected edges, based on the pattern information as described above. The CPU 2 then determines whether any one of the wheel stop 101, the white line 103a, or the obstacle 104 is recognized (Step S1-11). When the CPU 2 does not recognize any of them (Step S1-11=NO), the routine goes to Step S1-14 and the CPU 2 determines whether or not an end trigger has been input. In the current embodiment, the end trigger is a signal indicating any shift position other than "reverse" output from the neutral start switch 24. When the CPU 2 determines that an end trigger has not been input (Step S1-14=NO), the routine returns to Step S1-5.

When the CPU 2 recognizes that any one of the wheel stop 101, the white line 103a, or the obstacle 104 (Step S1-11=YES), the CPU 2 further determines whether the recognized object is now located under the rear bumper 25 (Step S1-12). At this time, the image processor 8 determines whether or not the edge EG of the recognized object has completely entered the area BA behind the vehicle. As shown in FIGS. 5C and 6B, when the image processor 8 determines that the edge EG corresponding to the wheel stop 101 or the edge EG corresponding to the obstacle 104 is not displayed within the display area 9z on the display 9 because the edge EG has completely entered the area BA behind the vehicle (Step S1-12=YES), the image processor 8 outputs a predetermined interrupt signal to the CPU 2 (Step S1-13). The interrupt signal is a signal for changing the image display mode to a new image display mode using the recorded image data 15. As shown in FIGS. 5A, 5B, and 6A, when the edge EG of the recognized object has not entered the area BA behind the vehicle (Step S1-12=NO), the routine goes to Step S1-14.

Figure 9:
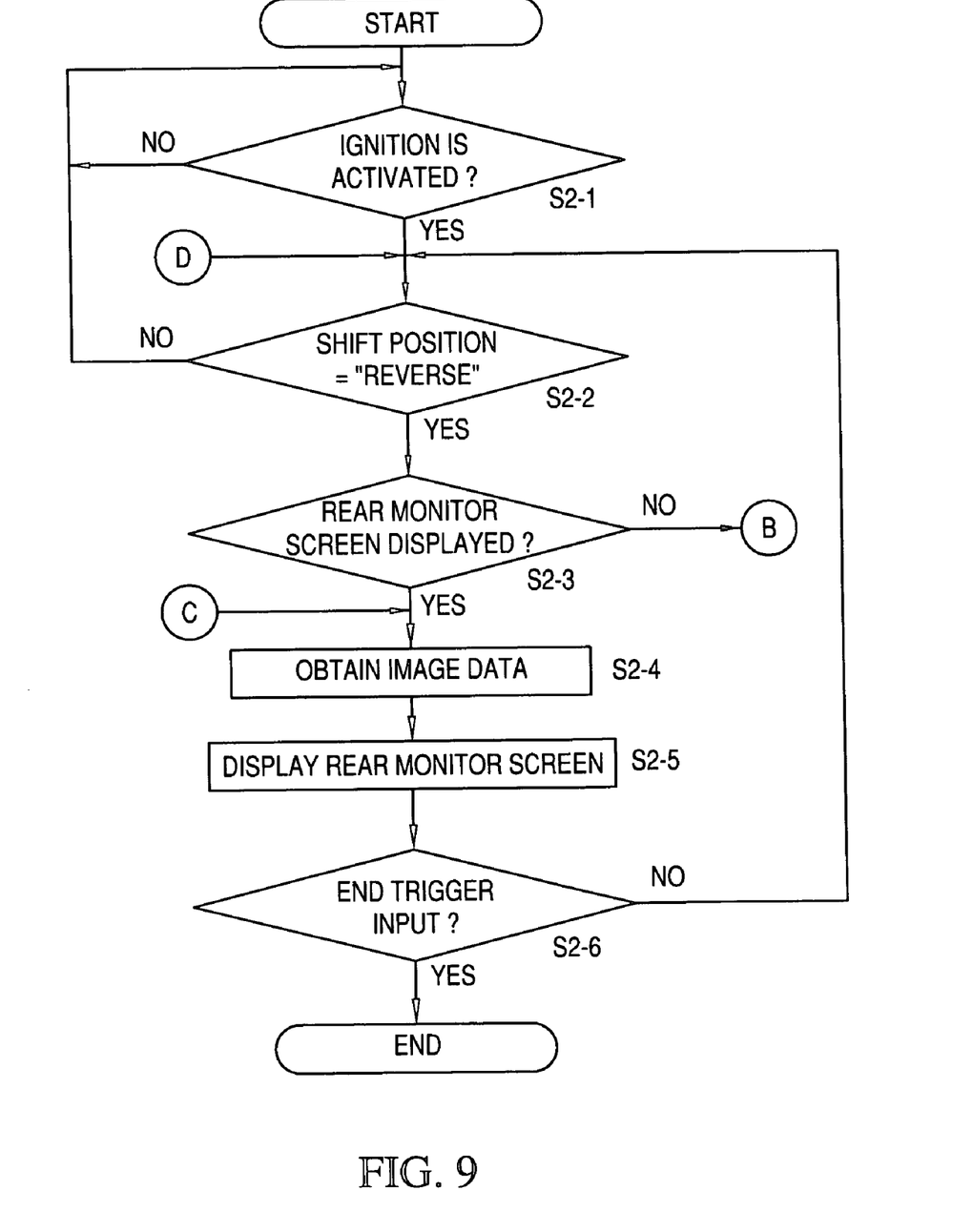
FIG. 9 is a flowchart of a routine for image display according to the present embodiment.

Next, a routine for displaying an image on the display 9 will be described with reference to FIG. 9. The routine shown in FIG. 9 is executed concurrently with the execution of the routine (Step S1-1 through S1-14) described above. First, when the CPU 2 of the parking assist apparatus 1 receives the on-signal from the ignition switch 23 (Step S2-1=YES) and determines that the shift position is "reverse" (Step S2-2=YES), the CPU 2 further determines whether a rear view should be displayed (Step S2-3). The CPU 2 further determines whether or not the interrupt signal described above has been input. In the case where there has been no input of an interrupt signal, the CPU 2 determines that the rear view should be displayed (Step S2-3=YES) and the routine goes to Step S2-4. In the case that the interrupt signal has been input, the routine goes to Step S3-1 in FIG. 10 to display an image using the recorded image data 15. More specifically, when the image processor 8 determines that the recognized object is not located under the vehicle C and when no interrupt signal is output, the image processor 8 executes the display of the rear monitor. On the other hand, when the image processor 8 determines that the recognized object is now located under the vehicle C and the interrupt signal is output in Step S1-13, the image processor 8 executes the display of the composite (synthesized) image using the recorded image data 15.

Figure 11A:
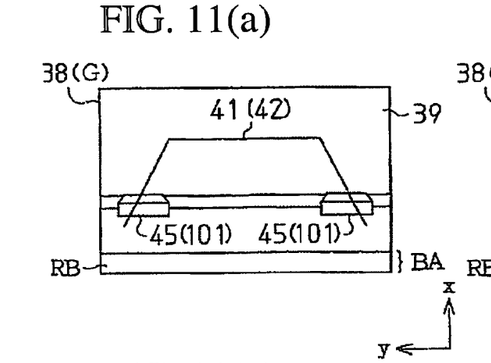
FIGS. 11A through 11C are diagrams showing a rear monitor screen before switching to a parking assist image and FIG. 11D is a diagram showing the parking assist image.

In step S2-3, when determining that the rear view should be displayed, the CPU 2 controls the camera 20 to obtain the image data G (Step S2-4). The image data G is obtained at the rate of 30 frames per second. When obtaining the image data G, the image processor 8 outputs the input image data G and various drawing data onto the display 9 and displays a rear monitor screen 38 as shown in FIG. 11A (Step S2-5). As shown in FIG. 11A, a background 39 and the area behind the vehicle RB are displayed as the rear monitor screen 38 based on the current image data G. Further, the image processor 8 superimposes the guide line 41 on the background 39. The guide line 41 here may be the extended line 43 indicating the width of the vehicle C and the probable movement locus 42.

When the image processor 8 displays the rear monitor screen 38, the CPU 2 determines whether or not an end trigger as described above has been input (Step S2-6). When the CPU 2 determines that an end trigger has not been received (input) (Step S2-6=NO), the routine returns to Step S2-2 and the CPU 2 waits for the input of the interrupt signal and the end trigger while updating the rear monitor screen 38.

Figure 11B:
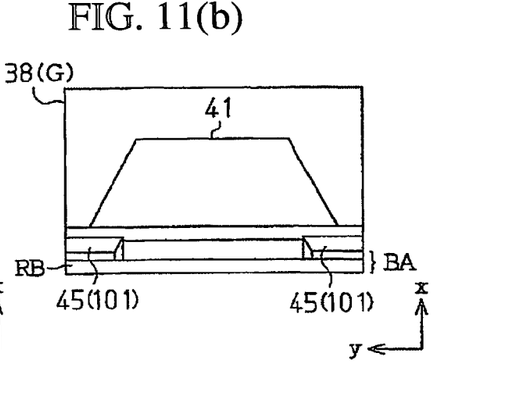

As the vehicle C enters within the parking space 102 and the rear wheel CR approaches the wheel stop 101, the image processor 8 detects edges within image data G captured each increment of movement of the vehicle C in reverse the predetermined distance (200 mm in this embodiment) and tracks the edges EG corresponding to recognized objects in accordance with the movement of the vehicle C. In Step S1-12, the image processor 8 determines whether or not the edge EG of an object selected for tracking from among the recognized objects has completely entered the area BA behind the vehicle. For example, when the vehicle C reverses, the rear monitor screen 38 on the display 9 is changed from the rear monitor screen 38 in FIG. 11A to the screen shown in FIG. 11B. More specifically, when the vehicle C reverses, the image 45 corresponding to the wheel stop 101 (or either of the white line 103a or the obstacle 104) approaches in the image of the area RB behind the vehicle in the rear monitor screen. Then as shown in FIG. 11B, when a part of the image 45 corresponding to the wheel stop 101 is no longer completely shown in the image RB, the CPU 2 does not output the interrupt signal.

Figure 11C:
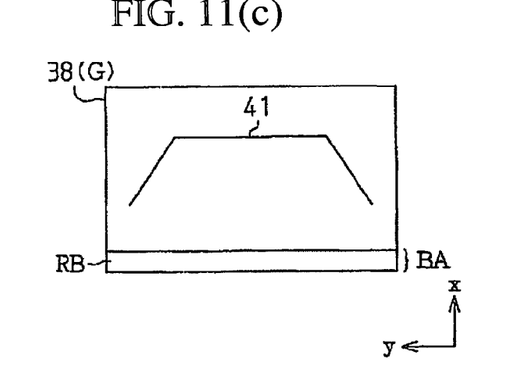

When, in the reverse movement of the vehicle C, the wheel stop 101 is completely located under the rear bumper 25, which means the edge EG corresponding to the wheel stop 101 has completely moved out of the area BA behind the vehicle and out of the viewing area of the camera 20 as shown in FIG. 11C, the image processor 8 outputs an interrupt signal to the CPU 2 in Step S1-13. After the CPU 2 receives the interrupt signal in Step S2-3, the routine goes to Step S3-1.

Figure 10:
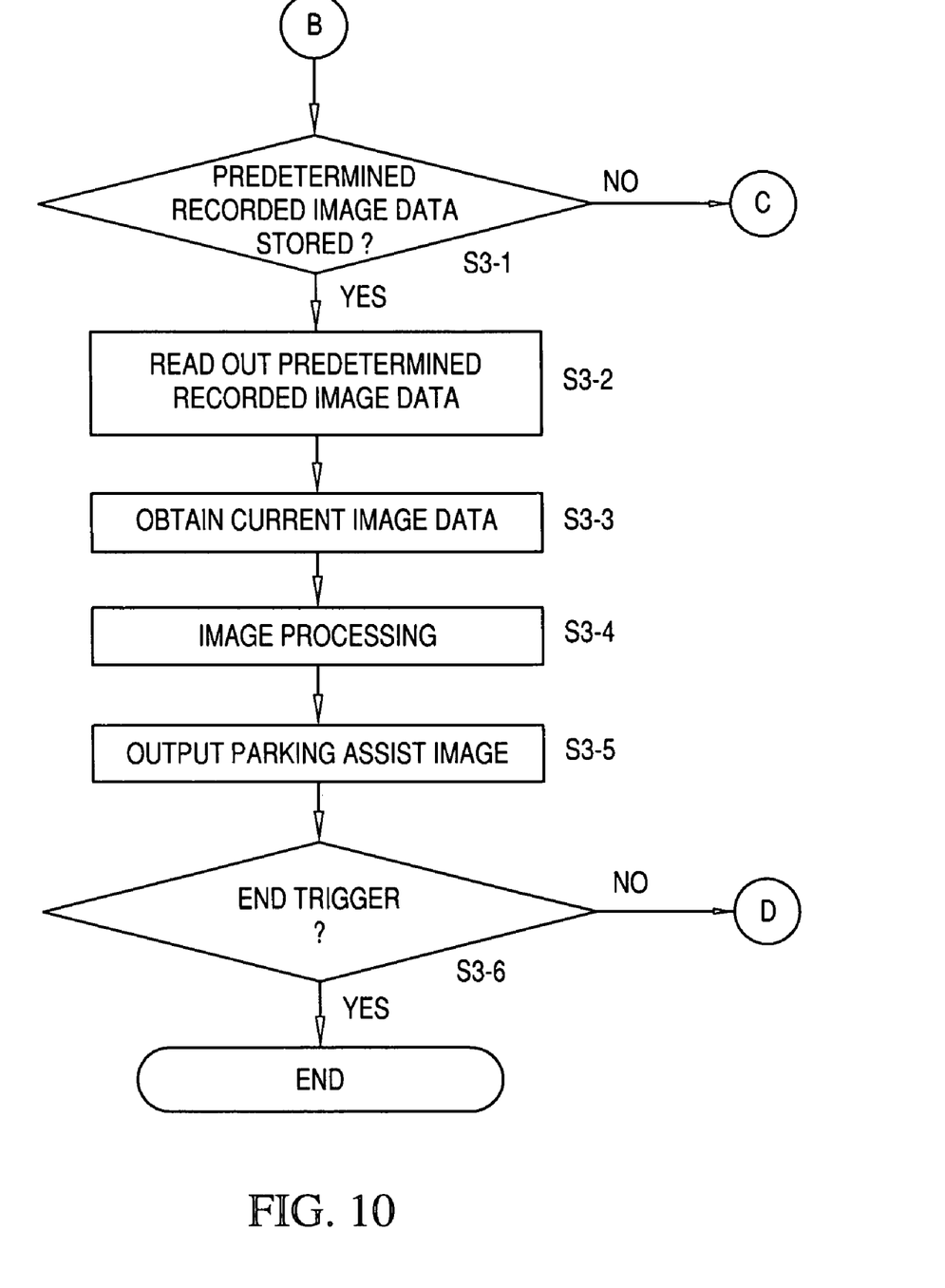
FIG. 10 is a flowchart of a search routine for recorded data according to the present embodiment.

As shown in FIG. 10, in Step S3-1, the image processor 8 is controlled by the CPU 2 to determine whether predetermined recorded image data 15 has been accumulated. In this embodiment, the image processor 8 searches only for the recorded image data 15 related to the position data 16 indicating a position, which is a predetermined distance (800 mm), behind the current position of the vehicle C in the direction of movement.

If the image processor 8 determines that the predetermined recorded image data 15 is not stored (Step S3-1=NO), the routine goes to Step S2-4 and the rear monitor screen 38 is displayed. When the image processor 8 determines that the predetermined recorded image data 15 is stored (Step S3-1=YES), the recorded image data 15 is read out from the image memory 7 (Step S3-2). For example, the recorded image data 15 such as the diagram 46a in FIG. 12A may be read out. The read out image data G is not current data obtained at the current position (the position where the wheel stop 101 is located under the vehicle) but, rather, is data obtained before the vehicle arrived at the current position. Also, the read out image data 15 includes an image of the current blind spot of the camera 20. More specifically, the recorded image data 15 may include a rough view of the area under the vehicle at the current position, which extends from the road surface under the rear bumper 25 to the center axis of the rear wheel CR of the current vehicle C.

After the recorded image data 15 is read out, the image processor 8 obtains the current image data 18 for at the current position of the vehicle C through the CPU 2 (Step S3-3). At this time, for example, the obtained current image data 18 may be like that of the diagram 46b of FIG. 12B. The image processor 8 then processes the image data for correction of the obtained recorded image data 15 or the current image data 18 (Step S3-4). The image data processing may, for example, include correction of distortion because of the wide-angle lens of the camera 20 and the view change for the recorded image data 15. In this example, only distortion correction is executed. Note that, based on the direction detection signal input from the gyro 22 or a rudder angle detection signal input from a steering sensor (not shown), the recorded image data 15 may be rotated in the direction of the current vehicle movement or be rotated with the rudder angle.

Figure 12A:
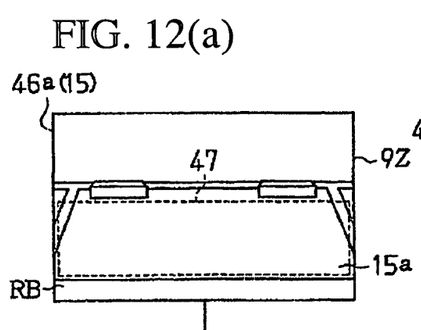
FIG. 12A is a diagram showing recorded image data.
Figure 12B:
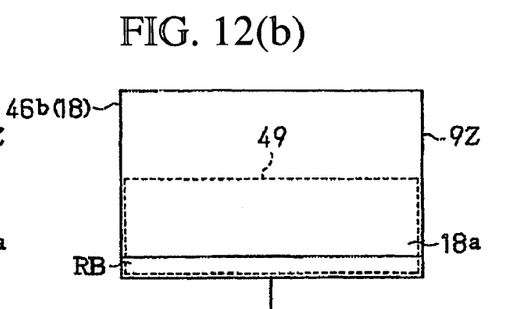
FIG. 12B is a diagram showing current image data.
Figure 12C:
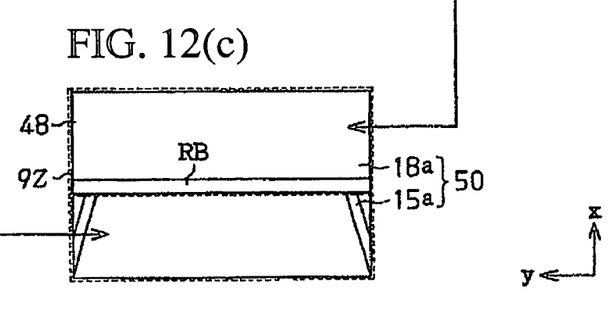
FIG. 12C is a diagram showing data which is a composite of both.

After such image processing, the image processor 8 outputs the parking assist image (Step S3-5). As shown in FIG. 12A, the image processor 8 abstracts a predetermined area 47, within the display area 9z, from the read out recorded image data 15 and generates abstracted data 15a. In the present embodiment, the abstracted area 47 is a brachymorphic area located at the bottom of the display area 9z. Further, as shown in FIG. 12B, the image processor 8 abstracts an area 49, which has pre-specified coordinates, from the current image data 18 and generates abstracted current data 18a. The abstracted area 49 is a brachymorphic area located at the bottom of the display area 9z. As shown in the image 48 of FIG. 12C, composite data 50, which includes the current abstracted data 18a on the top of the display area 9z and the data 15a abstracted from the recorded image data 15 on the bottom, is generated. The composite data 50 is output on the display 9, along with various drawing data.

Figure 11D:
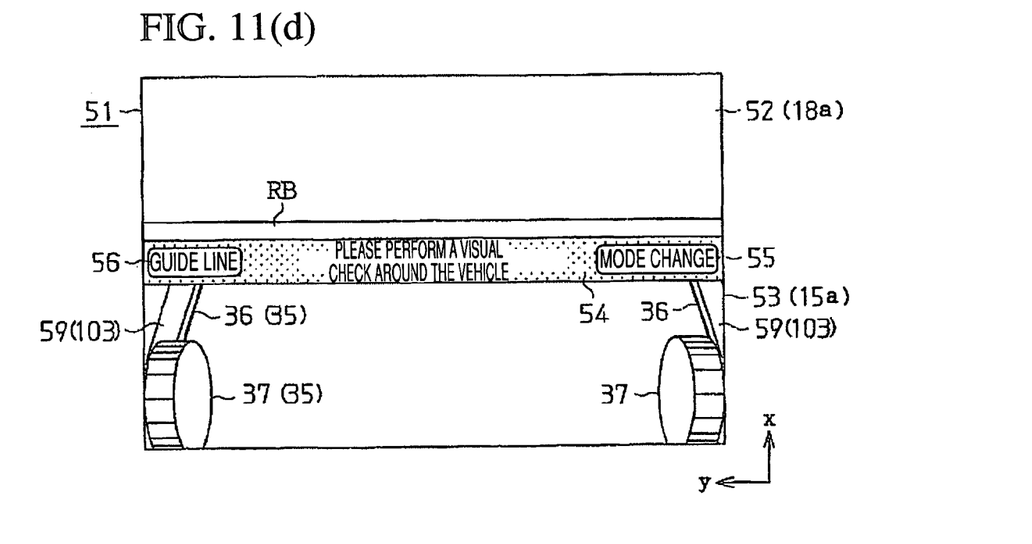

As a result, a parking assist image 51 is shown on the display 9 as shown in FIG. 11D. As the parking assist image 51, a current image 52 based on the current image data 18 is displayed at the top of the display and an image revealing the area hidden as the blind spot 53, based on the recorded image data 15, is displayed at the bottom of the display. In the current image 52, the background of the current position of vehicle C is displayed. In the image revealing the area hidden as blind spot 53, an image revealing the hidden area (blind spot of the camera 20) is displayed, including the road surface from the rear bumper 29 to the center of the rear wheel CR of the vehicle C, is displayed.

The image processor 8 also displays a band-like guidance display (messages) 54 between the current image 52 and the image revealing the area hidden as the blind spot 53. The guidance display 54 is not only for splitting the screen between the current image 52 and the image revealing the area hidden by the blind spot 53, but also displays guidance messages 54 to prompt a visual check around the vehicle. Further, the guidance display 54 includes an operational input section 55 for changing mode manually and an operational input section 56 for superimposing the guide line 41 on the current image 52. By touch input at the operational section 55, the mode displaying the parking assist image 51 is switched to the mode displaying the rear monitor screen 38. By touch input at the operational section 56, the guide line 41 is superimposed on the current image 52.

The image processor 8 draws the additional line 35, depending on the current position of the vehicle C, on the image revealing the area hidden as the blind spot 53. For example, the image processor 8 allows the driver of the vehicle to determine whether the vehicle body is parked straight relative to the white line 103 or whether the vehicle body is beyond the parking area as defined by the white lines 103, by providing a parking assist display showing the position of the framework line 36 relative to the image 59 of the white line 103 displayed as a parking assist image including the blind spot 53.

When the recognized object is within the viewing area Z of the camera 20, the background of the vehicle (view to the rear) is displayed fully so that the driver may know the position of the recognized object and the area around the object as well. When the recognized object disappears out of sight, the parking assist image 51 may be displayed, i.e. a virtual image showing the current position of the recognized object relative to the vehicle.

The CPU 2 outputs the parking assist image 51 and determines whether or not an end trigger has been received (Step S3-6). In the case where the end trigger has been received (Step S3-6=YES), execution of the routine is terminated. In the case where the end trigger has not been received (Step S3-6=NO), the routine returns to Step S2-2.

Figure 13:
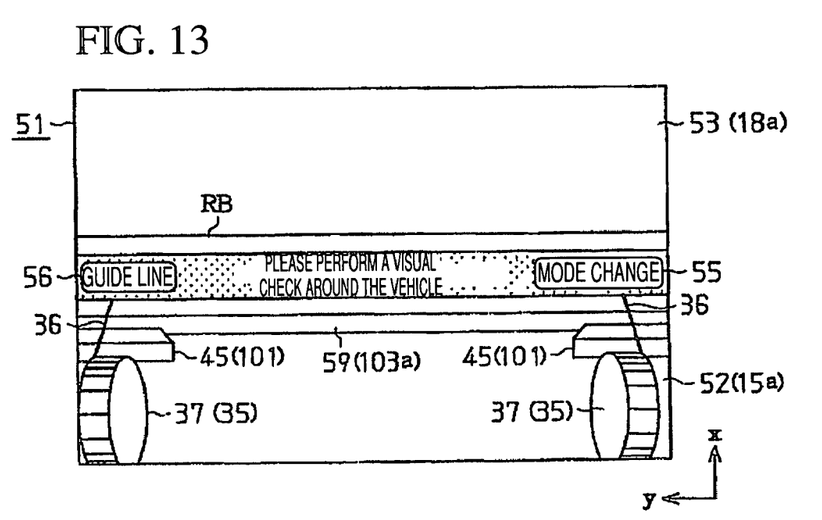
FIG. 13 is a diagram showing a parking assist image.

When the vehicle has moved to where the recognized object such as the wheel stop 101 is under the rear of the vehicle C, an image 45 of the wheel stop 101 is displayed in a virtual image revealing the area hidden as blind spot 53, as shown in FIG. 13, thus enabling the driver to see the position the wheel stop 101 relative to the wheel 37. Therefore, even if the recognized object disappears from the viewing area of the camera 20, the position of the object may be continuously known utilizing the recorded image data 15, to output a parking image including the blind spot. The driver may anticipate when the rear wheel CR will hit the wheel stop 101, based on the relative position between the image 45 and the wheel 37 (here, the additional line 35), and may park the vehicle in the proper position, with the rear wheel CR against the wheel stop 101. Further the driver may slow the vehicle to cushion the shock of bumping into the wheel stop 101.

As shown in FIG. 13, when the image 59 of the white line 103a is displayed, revealing the area hidden as the blind spot 53, the relative distance between the rear wheel CR and the white line 103a may be recognized, so that the driver may park with the vehicle C fully within the marked parking space 102.

Figure 14A:
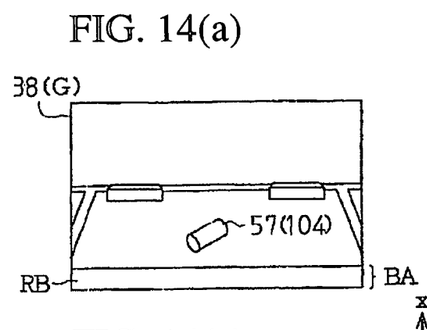
FIGS. 14A through 14C are diagrams showing a rear monitor screen before switching to a parking assist image and FIG. 14D is a diagram showing the parking assist image.
Figure 14B:
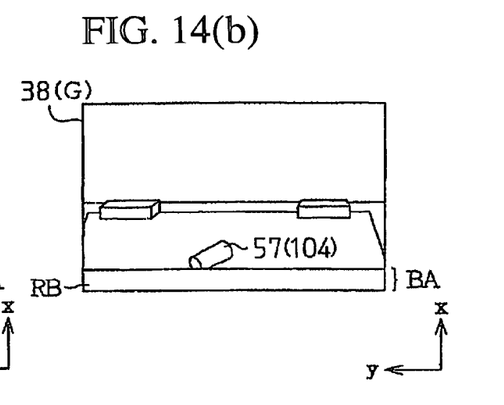
Figure 14C:
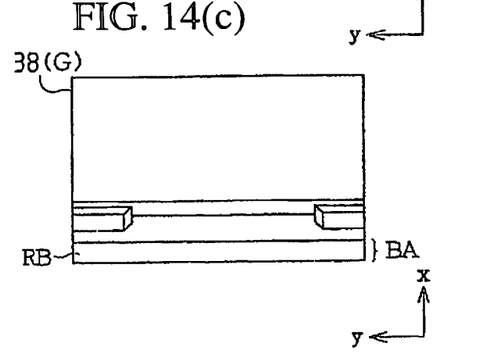
Figure 14D:
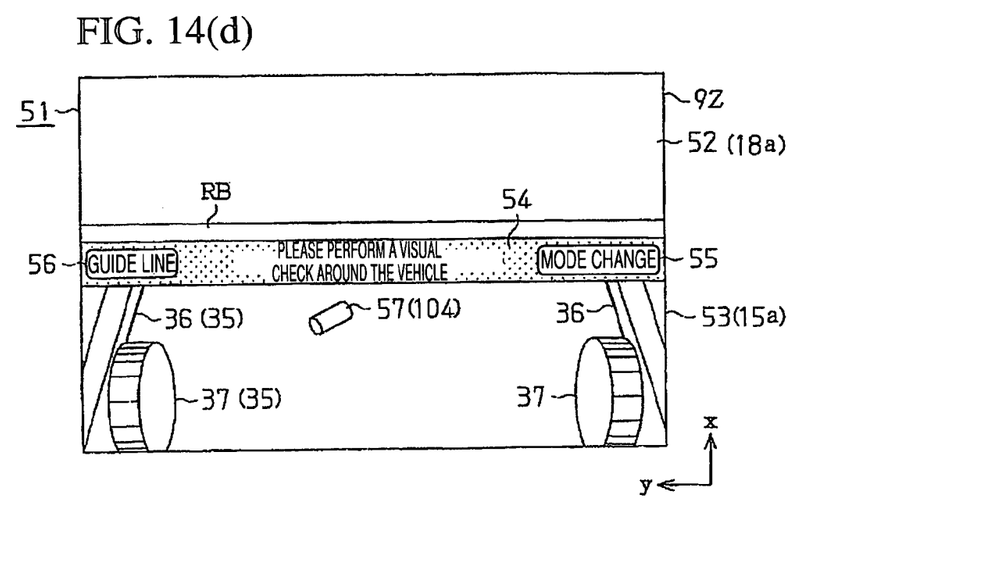

When an obstacle 104 is located ahead of the wheel stop 101 and/or the white line 103a during parking, and/or when either the wheel stop 101 or the white line 103a is not detected, only the obstacle 104 being detected, the image processor 8 tracks the edge EG of the obstacle 104 and determines whether the edge EG is included in the area BA behind the vehicle. As shown in FIGS. 14A and 14B, when the image 57 of the obstacle 104 is not completely within the area BA behind the vehicle, the image processor 8 displays the rear monitor screen 38 of FIGS. 14a and 14B. As shown in FIG. 14C, the image processor 8 waits until the image 57 (the edge EG) of the obstacle 104 completely within the area BA behind the vehicle before displaying the parking assist image 51. As the vehicle C moves further in reverse, the parking assist image 51 in FIG. 14D is displayed. The image revealing the area hidden as the blind spot 53, includes an image 57 of the obstacle 104. Therefore, the position of the wheel image 37 relative the image 57 of the obstacle 104 can be seen and the driver may steer the vehicle C (the rear wheel CR of the vehicle C) to avoid bumping into the obstacle 104.

When the parking operation is terminated and when a shift position other than "reverse" is chosen, the CPU 2 determines that an end trigger, based on the shift position signal input from the neutral start switch 24, has been received and terminates the display of both of the rear monitor (current or "real time" rear view) screen 38 and the parking assist screen 51.

The embodiment described above provides the following advantages.

1) The image processor 8 determines when to display the parking assist image 51 on the basis of the relative position of the recognized object within the area BA behind the vehicle. In the case that the recognized object is within the viewing area of the camera 20, the rear monitor screen 38 displays the area behind of the vehicle C without narrowing the view. Thus, the driver may know the position of a recognized object relative to the vehicle C by viewing the rear monitor screen 38. When the recognized object goes under the bumper and out of the viewing area from the camera 20, the rear monitor screen 38 displays the parking assist image 51. More specifically, when the object which the driver wants to check goes is no longer in sight or viewable in the current image on the rear monitor, the recorded image data 15 including the hidden area where the object is located is displayed, so that the driver may continuously check the position of the object. Further, along with the parking assist image 51, the current image 52 may also be displayed (concurrently displayed).

2) The image processor 8 displays the parking assist image 51 when it has been determined that the edge EG corresponding to the recognized object has completely entered the area behind the vehicle BA. Therefore, while at least a part of the recognized object is within the viewing area Z of the camera 20, the current image from the camera 20 may be displayed on the rear monitor screen 38. The driver may check the relative position between the rear of the vehicle C and the recognized object and also a wide view angle view of the current conditions around the vehicle.

The current image 52 and the image revealing the area hidden as the blind spot 53 may be displayed one above the other on the display area 9z when the vehicle C is moving in reverse (x-axis on the screen coordinate system). At this time, the image revealing the area hidden as the blind spot 53 is displayed so that the direction of movement in the image is opposite that of the vehicle C. That is, in accordance with the movement of the vehicle C in reverse, the image revealing the area hidden as the blind spot 53 is displayed so that the direction of movement in the image is the same as that of the recognized object within the display area 9z (the opposite direction on the x-axis). Therefore, even if the recognized object disappears from sight within the display area 9z, the image revealing the area hidden as the blind spot 53 may be displayed so that the direction of movement in the image corresponds to the direction of movement of the object relative to the vehicle so that the driver may intuitively know the real-time image to which the image revealing the area hidden as the blind spot 53 corresponds.

4) According to the present embodiment, the image processor 8 automatically detects the wheel stop 101 or the white line 103a indicating the end of the parking space 102 by image data processing. Therefore, the driver does not need to specify the object to be recognized manually, thus improving convenience to the driver.

5) The image processor 8 detects the obstacle 104 such as a can or a stone on the road surface and subsequently displays the parking assist image 51 when the obstacle 104 is located under the vehicle body. Thus, the displayed parking assist image 51 enables the driver to know the relative position and distance between the rear wheel CR and the obstacle 104 and the relative position and distance between the rear of the vehicle and the white line 103a.

The embodiment described above may be modified as follows.

1) While in the embodiment as described above, the CPU 2 of the parking assist apparatus 1 stores the image data G as the recorded image data 15 every time the vehicle C moves a predetermined distance in reverse, in the alternative, the CPU 2 may obtain the image data G at regular time intervals.

2) The image processor 8 may determine whether the obstacle 104 is a non-movable body or a movable body. This determination may be made, for example, by detecting the difference between two sets of image data G captured at different points in time. If the image processor 8 determines that the obstacle 104 is a movable body, the display mode does not need to be changed to display the parking assist image 51.

3) While in the above described embodiment the parking assist image 51 is displayed when the edge EG corresponding to the recognized object has completely entered the area BA behind the vehicle, the parking assist image 51 does not necessarily need to be displayed at such a time and may be displayed at some other time. For example, as shown in FIG. 11B, the parking assist image 51 may be displayed when a part of the image 45 (the edge EG) of the recognized object such as the wheel stop 101 has entered the area BA behind the vehicle BA or when the relative distance between the image 45 (the edge EG) of the recognized object and the area BA behind the vehicle has reached a predetermined length in terms of the screen coordinate system.

4) While in the above-described embodiment the parking assist image 51 is displayed when the image (the edge EG) corresponding to the recognized object such as the wheel stop 101 enters the area BA behind the vehicle, the parking assist image 51 may be displayed when the recognized object is no longer within the field of view of the camera 20, regardless of whether the object is within or outside of the area BA behind the vehicle. For example, the parking assist image 51 may be displayed when the image (the edge EG) corresponding to the recognized object moves out of the display area 9z with movement of the vehicle C in reverse. Then the blind spot image including the recognized object may be used as the parking assist image 51.

5) While the foregoing embodiment describes the image processor 8 as detecting the wheel stop 101, the white line 103a, and/or the obstacle 104, the image processor may detect other objects. For example, any object indicating the end and/or side of the parking space 102 such as, for example, a wall around the parking space 102, a guardrail, a cone located on the road or roadside, a fence, and/or a barricade, may be detected.

6) In the above-described embodiment the image processor 8 displays the parking assist image 51 when the wheel stop 101 or the white line 103a indicating the end of the parking space 102 goes out of sight. However, the parking assist image 51 may be displayed when a white line other than the white line 103a exits the field of view of the camera 20. For example, the parking assist image 51 may be displayed when the white line indicating the side of the parking space 102 or the starting point of the white line 103 in the shape of a "U" indicating the parking space 102 goes out of the field of view of the camera 20.

Figure 15:
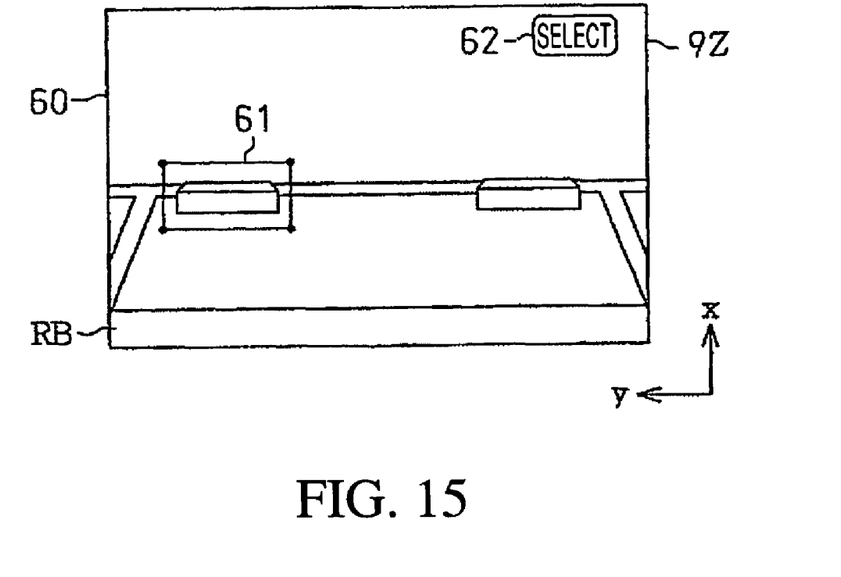
FIG. 15 is a diagram showing another parking assist image.

7) In the above-described embodiment, the image processor 8 recognizes the object such as the wheel stop 101 and displays the parking assist image 51 when the recognized object has completely entered the area BA behind the vehicle. However, the user may specify the object to be recognized by touch (manual) operation on the display 9. More specifically, as in the screen 60 of FIG. 15, the user may specify some points on the display 9 (touch panel) to cause the operating section 62 to set a small area 61 such as, for example, a triangle, a rectangle or a polygon, which has the specified points as vertexes. Also the user may specify only one point and a small area 61 may be set as a circle which has the specified point as the center. The small area 61 thus set may be tracked based on the speed pulse and the direction of the vehicle C, in accordance with movement of the vehicle C in reverse, so that the parking assist image 51 is displayed when the small area 61 has completely entered the area BA behind the vehicle. In this case, the user need specify only the object which he/she wants to track.

Figure 16:
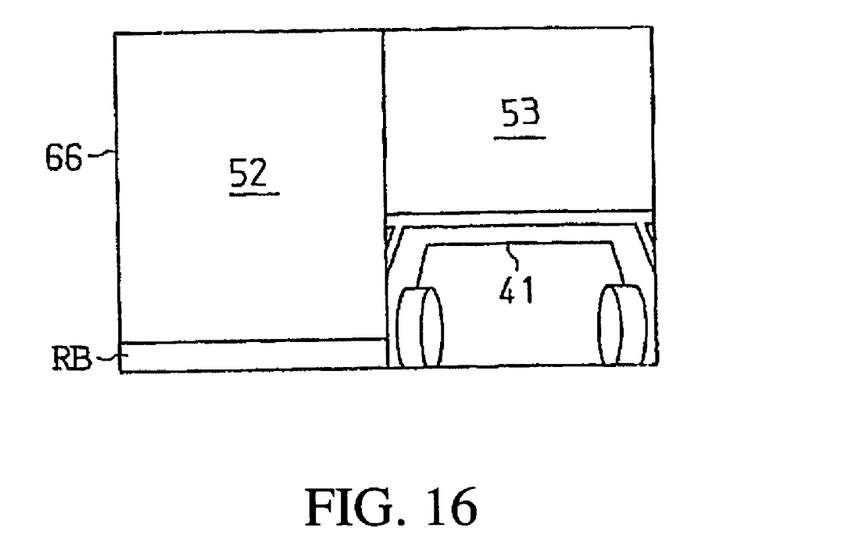
FIG. 16 is a diagram showing yet another parking assist image.

8) While in the foregoing embodiment, the current image 52 and the image revealing the area hidden as the blind spot 53 are displayed one above the other on the display area 9z, as shown in the image 66 of FIG. 16, the current image 52 and the image revealing the area hidden as the blind spot 53 may be displayed side by side.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A parking assist method for a vehicle comprising:
accumulating image data, obtained from an imaging device mounted on the vehicle, as recorded image data in image data storage means,
recognizing an object based on the image data;
determining when to display a parking assist image, wherein an area hidden as a current blind spot of the imaging device is shown, on the basis of a position of the object in relation to the blind spot of the imaging device; and
displaying the parking assist image, based on the recorded image data, in accordance with the determination.

2. A parking assist apparatus, comprising:
an imaging device, mounted on a vehicle, which generates image data;
an image data storage unit which stores the image data generated by the imaging device as recorded image data;
an image processor which recognizes an object based on the recorded image data, which determines when to display a parking assist image in which an area hidden as a current blind spot of the imaging device is shown, based on a position of the recognized object in relation to the blind spot of the imaging device, which displays the parking assist image using both current image data generated by the imaging device at a current position of the vehicle and stored recorded image data including the area hidden as the current blind spot of the imaging device, and which displays an indicator indicating the current position of the vehicle with the parking assist image.

3. The parking assist apparatus according to claim 2, wherein:
the image processor determines that when a part of or whole of the recognized object has entered the blind spot of the imaging device, the parking assist image using the recorded image data is displayed.

4. The parking assist apparatus according to claim 2 or claim 3, wherein:
the imaging device is mounted on the upper side of a bumper of the vehicle; and
the image processor determines that when the part of or whole of the recognized object is under the bumper of the vehicle, the parking assist image is displayed.

5. The parking assist apparatus according to of claim 2, wherein:
the image processor outputs the recorded image data including the blind spot of the imaging device in the direction of relative movement of the recognized object.

6. The parking assist apparatus according to claim 2, wherein:
the recognized object is a wheel stop or a white line bordering a parking space; and
the image processor recognizes the wheel stop or the white line by processing the image data.

7. The parking assist apparatus according to claim 2, wherein:
   the recognized object is an obstacle located within or around the parking space; and
   the image processor recognizes the obstacle by processing the image data.

8. The parking assist apparatus according to claim 2, wherein:
   the image processor recognizes an object selected by manual input.

9. The parking assist apparatus according to claim 2, wherein:
   the parking assist apparatus, responsive to a determination by the image processor not to display the parking assist image, displays only a real-time image utilizing the image data currently obtained at the current position of the vehicle.

10. The parking assist apparatus according to claim 2, wherein:
    the parking assist apparatus displays, responsive to a determination by the image processor to display the parking assist image, concurrently displays, in different portions of a single display screen, a real-time image, utilizing the image currently taken at the current position of the vehicle, and the parking assist image.

* * * * *